(12) United States Patent
Zhang et al.

(10) Patent No.: US 7,110,000 B2
(45) Date of Patent: Sep. 19, 2006

(54) SYNTHESIS OF PROGRESSIVELY-VARIANT TEXTURES AND APPLICATION TO ARBITRARY SURFACES

(75) Inventors: Jingdan Zhang, Chapel Hill, NC (US); Kun Zhou, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/698,792

(22) Filed: Oct. 31, 2003

(65) Prior Publication Data

US 2005/0093875 A1   May 5, 2005

(51) Int. Cl.
*G06T 15/30* (2006.01)
*G06T 17/00* (2006.01)
*G09G 5/00* (2006.01)
*G06K 9/36* (2006.01)

(52) U.S. Cl. ............... 345/582; 345/626; 345/428; 345/592; 345/619; 382/285

(58) Field of Classification Search ........ 382/282–285, 382/300; 345/418–420, 427–428, 581–584, 345/586–589, 592–593, 423, 606, 607, 619, 345/626, 646–647
See application file for complete search history.

(56) References Cited

U.S. PATENT DOCUMENTS

| | | | |
|---|---|---|---|
| 5,872,867 | A | 2/1999 | Bergen |
| 6,177,034 | B1 | 1/2001 | Ferrone |
| 6,700,585 | B1 | 3/2004 | Ritter |
| 6,760,488 | B1 | 7/2004 | Moura et al. |
| 6,864,897 | B1 | 3/2005 | Brand |
| 6,947,055 | B1 | 9/2005 | Ritter |
| 6,987,568 | B1 | 1/2006 | Dana |
| 7,002,592 | B1 | 2/2006 | Horton et al. |
| 7,006,103 | B1 | 2/2006 | Horton |
| 2003/0206176 | A1 | 11/2003 | Ritter |
| 2004/0001059 | A1 | 1/2004 | Pfister |
| 2004/0096120 | A1* | 5/2004 | Tong et al. .......... 382/285 |

OTHER PUBLICATIONS

Ashikhmin, M. 2001. Synthesizing natural textures. *ACM Symposium on Interactive 3D Graphics*, 217-226.

Bar-Joseph, Z., El-Yaniv, R., Lischinski, D., and Werman, M. 2001. Texture mixing and texture movie synthesis using statistical learning. *IEEE Transactions on Visualization and Computer Graphics 7*, 2, 120-135.

Beier, T., and Neely, S. 1992. Feature-based image metamorphosis. *Computer Graphics (Proceedings of SIGGRAPH 92) 26*, 2 (Jul.), 35-42.

(Continued)

*Primary Examiner*—Wesner Sajous
(74) *Attorney, Agent, or Firm*—Westerman, Champlin & Kelly, P.A.; Steven M. Koehler

(57) ABSTRACT

Methods for synthesizing progressively-variant textures based on texton masks are provided. A first method creates a synthesized texture image guided by a sample texture, first texton mask corresponding to the sample texture and a second texton mask modified based on the first texton mask. A second method also creates a synthesized texture image guided by a first and second sample textures and corresponding first and second texton masks. A method for rendering a synthesized texture on an image of a three-dimensional object includes creating a synthesized texture on the object guided by a two-dimensional progressively-variant sample texture, a texton mask for the sample texture and a mesh of a plurality of vertices representing the object.

14 Claims, 9 Drawing Sheets

OTHER PUBLICATIONS

Brooks, S., and Dodgson, N. 2002. Self-similarity based texture editing. *ACM Transactions on Graphics 21*, 3 (Jul.), 653-656. (Proceedings of ACM SIGGRAPH 2002).

Dischler, J., Maritaud, K., L evy, B., and Ghazanfarpour, D. 2002. Texture particles. *Computer Graphics Forum 21*, 3, 401-410.

Efros, A. A., and Freeman, W. T. 2001. Image quilting for texture synthesis and transfer. In *Proceedings of ACM SIGGRAPH 2001*, Computer Graphics Proceedings, Annual Conference Series, 341-346.

Efros, A. A., and Leung, T. K. 1999. Texture synthesis by non-parametric sampling. In *Proceedings of International Conference on Computer Vision*.

Gomes, J., Costa, B., Darsa, L., and Velho, L. 1998. *Warping and Morphing of Graphics Objects*. Morgan Kaufmann.

Gorla, G., Interrante, V., and Sapiro, G. 2001. Growing fitted textures. *SIGGRAPH 2001 Sketches and Applications* (Aug.), 191.

Gud, C., Zhu, S. C., and Wu, Y.-N. 2001. Visual learning by integrating descriptive and generative methods. In *Proceedings of International Conference on Computer Vision (ICCV)*, 370-377.

Harrison, P. 2001. A non-hierarchical procedure for synthesis of complex textures. In *Proceedings of Winter School of Computer Graphics*.

Hertzmann, A., Jacobs, C. E., Oliver, N., Curless, B., and Salesin, D. H. 2001. Image analogies. *Proceedings of SIGGRAPH 2001* (Aug.), 327-340.

Leung, T. K., and Malik, J. 1996. Detecting, localizing and grouping repeated scene elements from an image. In *Proceedings of European Conference on Computer Vision*.

Liang, L., Liu, C., Xu, Y., Guo, B., and Shum, H.-Y. 2001. Real-time texture synthesis using patch-based sampling. *ACM Transactions on Graphics 20*, 3 (Jul.).

Liu, Z., Liu, C., Shum, H.-Y., and Yu, Y. 2002. Pattern-based texture metamorphosis. In *Proceedings of Pacific Graphics*, 184-191.

Malik, J., Belongie, S., Shi, J., and Leung, T. 1999. Textons, contours and regions: cue integration in image segmentation. In *Proceedings of International Conference on Computer Vision (ICCV)*, 918-925.

Mallat, S., Papanicolaou, G., and Zhang, Z. 1998. Adaptive covariance estimation of locally stationary processes. *Annals of Statistics 26*, 1, 1-47.

Praun, E., Finkelstein, A., and Hoppe, H. 2000. Lapped textures. *Proceedings of SIGGRAPH 2000* (Jul.), 465-470.

Soler, C., Cani, M.-P., and Angelidis, A. 2002. Hierarchical pattern mapping. *ACM Transactions on Graphics 21*, 3 (Jul.), 673-680. (Proceedings of ACM SIGGRAPH 2002).

Suzuki, S., and Abe, K. 1985. Topological structural analysis of digital binary images by border following. *Computer Vision, Graphics, and Image Processing 30*, 1, 32-46.

Tong, X., Zhang, J., Liu, L., Wang, X., Guo, B., and Shum, H.-Y. 2002. Synthesis of bidirectional texture functions on arbitrary surfaces. *ACM Transactions on Graphics 21*, 3 (Jul.), 665-672. (Proceedings of ACM SIGGRAPH 2002).

Tonietto, L., and Walter, M. 2002. Towards local control for image-based texture synthesis. In *Proceedings of SIBGRAPI 2002—XV Brazilian Symposium on Computer Graphics and Image Processing*.

Turk, G. 1991. Generating textures for arbitrary surfaces using reaction-diffusion. *Computer Graphics (Proceedings of SIGGRAPH 91) 25*, 4 (Jul.), 289-298.

Turk, G. 2001. Texture synthesis on surfaces. *Proceedings of SIGGRAPH 2001* (Aug.), 347-354.

Walter, M., Fournier, A., and Menevaux, D. 2001. Integrating shape and pattern in mammalian models. *Proceedings of SIGGRAPH 2001* (Aug.), 317-326.

Wei, L.-Y., and Levoy, M. 2000. Fast texture synthesis using tree-structured vector quantization. *Proceedings of SIGGRAPH 2000* (Jul.), 479-488.

Wei, L.-Y., and Levoy, M. 2001. Texture synthesis over arbitrary manifold surfaces. *Proceedings of SIGGRAPH 2001* (Aug.), 355-360.

Wei, L.-Y. 2001. *Texture Synthesis by Fixed Neighborhood Searching*. Ph.D. Dissertation, Stanford University.

Witkin, A., and Kass, M. 1991. Reaction-diffusion textures. *Computer Graphics (Proceedings of SIGGRAPH 91) 25*, 4 (Jul.), 299-308.

Ying, L., Hertzmann, A., Biermann, H., and Zorin, D. 2001. Texture and shape synthesis on surfaces. *Proceedings of 12th Eurographics Workshop on Rendering* (Jun.), 301-312.

Zalesny, A., Ferrari, V., Caenen, G., der Maur, D. A., and Gool, L. V. 2002. Composite texture decriptions. In *Proceedings of ECCV*, vol. 3, 341-346.

Zhu, S., Wu, Y., and Mumford, D. 1998. Filters random fields and maximum entropy (frame). *International Journal of Computer Vision 27*, 2 (Mar.), 107-126.

Sunil Arya, David Mount, Nathan Netanyahu, Ruth Silverman, and Angela Wu. An optimal algorithm for approximate nearest neighbor searching. *Journal of the ACM*, 45:891-923, 1998.

Oana G. Cula and Kristin J. Dana. Compact representation of bidirestional texture functions. in *Proceedings of IEEE Conference on Computer Vision and Pattern Recognition*, Dec. 2001.

Brian Curless and Marc Levoy. A volumetric method for building complex models from range images. In *Proceedings of SIGGRAPH 96*, computer Graphics Proceedings, Annual Conference Series, pp. 303-312, New Orleans, Louisiana, Aug. 1996.

Kristin J. Dana and Shree Nayar. 3d textured surface modeling. In *Proceedings of IEEE Workshop on the Integration of Appearance and Geometric Methods in Object Recognition*, pp. 46-56, Jun. 1999.

Kristin J. Dana, Bram van Ginneken, Shree K. Nayar, and Jan J. Koenderink. Reflectance and texture of real-world surfaces. *ACM Transactions on Graphics*, 18(1):1-34, Jan. 1999.

Paul E. Debevec, Yizhou Yu, and George D. Borshukov. Efficient view dependent image-based rendering with projective texture-mapping. *Eurographics Rendering Workshop 1998*, pp. 105-116, Jun. 1998.

Pei hsiu Suen and Glenn Healey. The analysis and recognition of real-world textures in 3d. *IEEE Transactions on Patten Analysis and Machine Intelligence*, 22(5):491-503, May 2000.

Jan J. Koenderink and Andrea J. Van Doom. Illuminance texture due to surface mesostructure. *Joournal of the Optical Society of America*, 13(3):452-463, 1996.

Thomas Leung and Jitendra Malik. Representing and recognizing the visual appearance of materials using 3d textons. *International Journal of Computer Vision*, 43(1):29-44, Jun. 2001.

Xinguo Liu, Yizhou Yu, and Heung-Yeung Shum. Synthesizing bidirectional texture functions for real-world surfaces. *Proceedings of SIGGRAPH 2001*, pp. 97-106, Aug. 2001.

Jerome Maillot, Hussein Yahia, and Anne Verroust. Interactive texture mapping. *Proceedings of SIGGRAPH 93*, pp. 27-34, Aug. 1993.

Tom Malzbender, Dan Gelb, and Hans Wolters. Polynomial texture maps. *Proceedings of SIGGRAPH 2001*, pp. 519-528, Aug. 2001.

Greg Turk. Re-tiling polygonal surfaces. *Computer Graphics (Proceedings of SIGGRAPH 92)*, 26(2):55-64, Jul. 1992.

Daniel N. Wood, Daniel I. Azuma, Ken Aldinger, Brian Curless, Tom Duchamp, David H. Salesin, and Werner Stuetzle. Surface light fields for 3d photography. In *Proceedings of SIGGRAPH 2000*, Computer Graphics Proceedings, Annual Conference Series, pp. 287-296, Jul. 2000.

Lexing Ying, Aaron Hertzmann, Henning Biermann, and Denis Zorin. Texture and shape synthesis on surfaces. *Proceedings of 12th Eurographics Workshop on Rendering*, pp. 301-312, Jun. 2001.

Bryan P. Bergeron. Morphing as a means of generating variation in visual medical teaching m,aterials. *Computers in Biology and Medicine*, 24:11-18, Jan. 1994.

Chris Buehler, Michael Bosse, Leonard McMillan, Steven J. Gortler, and Michael F. Cohen. Unstructured lumigraph rendering. *Proceedings of SIGGRAPH 2001*, pp. 425-432, Aug. 2001.

Shenchang Eric Chen and Lance Williams. View interpolation for image synthesis. *Proceedings og SIGGRAPH 93*, pp. 279-288, Aug. 1993.

Daniel Cohen-Or, Amira Solomovici, and David Levin. Three-dimensional distance field metamorphosis. *ACM Transactions on Graphics*, 17(2):116-141, Apr. 1998. ISSN 07300301.

Douglas DeCarlo and Jean Gallier. Topological evolution of surfaces. *Graphics Interface '96*, pp. 194-203, May 1996.

Julie Dorsey and Pat Hanrahan. Modeling and rendering of metallic patinas. *Proceedings of SIGGRAPH 96*, pp. 387-396, Aug. 1996.

Steven J. Gortler, radek Grzeszczuk, Richard Szeliski, and Michael F. Cohen. The lumigraph. *Proceedings of SIGGRAPH 96*, pp. 43-54, Aug. 1996.

Arthur Gregory, Andrei State, Ming C. Lin, Dinesh Manocha, and Mark A. Livingston. Interactive surface decomposition for polyhedral morphing. *The Visual Computer*, 15(9):453-470, 1999.

John F. Hughes. Scheduled fourier volume morphing. *Computer Graphics (Proceedings of SIGGRAPH 92)*, 26(2):43-46, Jul. 1992.

James R. Kent, Wayne E. Carlson, and Richard E. Parent. Shape transformation for polyhedral objects. *Computer Graphics (Proceedings of SIGGRAPH 92)*, 26(2):47-54, Jul. 1992.

Francis Lazarus and Anne Verroust. Three-dimensional metamorphosis: a survey. *The Visual Computer*, 14(89):373-389, 1998.

Aaron lee, David Dobkin, Wim Sweldens, and Peter Schroder. Multiresolution mesh morphing. *Proceedings of SIGGRAPH 99*, pp. 343-350, Aug. 1999.

Apostolos Lerios, Chase D. Garfinkle, and Marc Levoy. Feature-based volume metamorphosis. *Proceedings of SIGGRAPH 95*, pp. 449-456, Aug. 1995.

Marc Levoy. Expanding the horizons of image-based modeling and rendering. In *SIGGRAPH 97 Panel:Image-based Rendering:Really New or Deja Vu*, 1997.

Marc Levoy and Pat Hanrahan. Light field rendering. *Proceedings of SIGGRAPH 96*, pp. 31-42, Aug. 1996.

Wojciech Matusik, Chris Buehler, Ramesh Raskar, Steven J. Gortler, and Leonard McMillan. Image-based visual hulls. In *Proceedings of ACM SIGGRAPH 2000*, Computer Graphics Proceedings, Annual Conference Series, pp. 369-374, Jul. 2000.

Steven M. Seitz and Charles R. Dyer. View morphing. *Proceedings of SIGGRAPH 96*, pp. 21-30, Aug. 1996.

Steven M. Seitz and Kiriakos N. Kutulakos. Plenoptic image editing. In *ICCV98*, pp. 17-24, 1998.

Jonathan Shade, Steven J. Gortler, Li wei He, and Richacd Szeliski. Layered depth images. In *Proceedings of SIGGRAPH 98*, Computer Graphics Proceedings, Annual Conference Series, pp. 231-242, Orlando, Florida, Jul. 1998.

HeungYeung Shum and Li Wei He. Rendering with concentric mosaics. *Proceedings of SIGGRAPH 99*, pp. 299-306, Aug. 1999. ISBN 0201485605. Held Los Angeles, California.

Laszlo Szirmay-Kalos and Werner Purgathofer. Global raybundle tracing with hardware acceleration. *Eurographics Rendering Workshop 1998*, pp. 247-258, Jun. 1998.

George Wolberg. Image morphing: a survey. *The Visual Computer*, 14(89):360-372, 1998.

\* cited by examiner

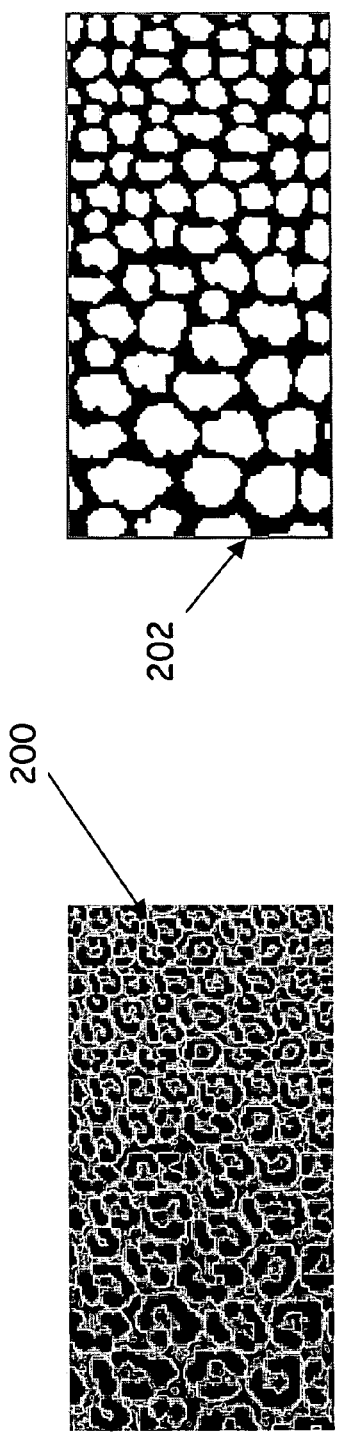
FIG 2B
FIG 2A
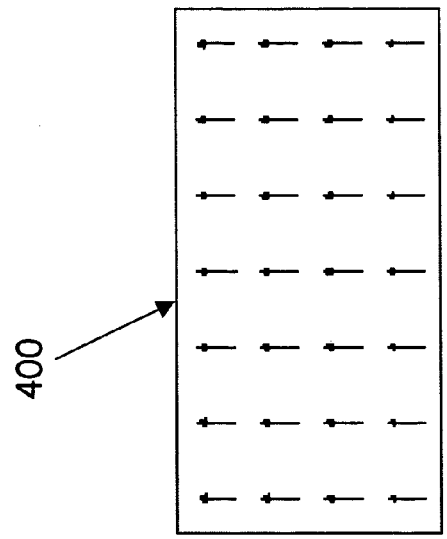
FIG 4
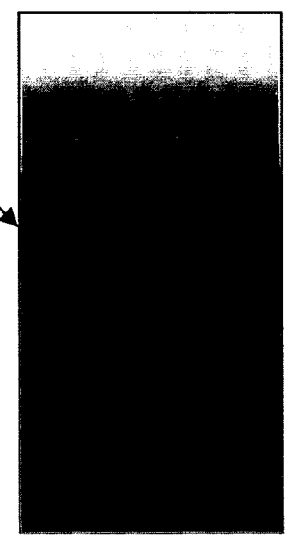
FIG 3

SYNTHESIS OF PROGRESSIVELY-VARIANT TEXTURES AND APPLICATION TO ARBITRARY SURFACES

BACKGROUND OF THE INVENTION

The present invention relates to computer generated graphics. In particular, the present invention relates to the modeling and rendering of realistic graphics on a computer.

Computer graphics are used in many different applications including computer games, movies and web pages. With the capability of more powerful computers, realistic graphics are becoming more desired in order to provide a more realistic experience to the computer user.

One particular area of focus has been in area of synthesized textures on two-dimensional and three-dimensional shapes. A texture is the visual surface features of the object and can include scale, orientation, shape and/or color of geometric elements of a pattern or pseudo-pattern on the surface of the object. Much of the previous work on surface texture synthesis concentrated on homogeneous textures. These textures are stationary in that they are characterized by stationary stochastic models. Homogeneous textures, however, only account for a limited class of real world textures. Many textures, including the fur patterns of various animals such as the tiger or the leopard, cannot be described by stationary models. These patterns exhibit complex variations resulting from a biological growth process. Another example includes stonework on a building or other structure.

One way to create textures with local variations is through simulation of chemical or biological processes. These techniques have used reaction diffusion differential equations to model texture surfaces that vary, for instance, by changing the diffusion rates on the target surfaces. Using such modeling techniques may limit the textures to which the process can be applied. In addition, the parameters, and the changing of the parameters, may not be intuitive to many users.

Accordingly, a systematic method for modeling and/or rendering of variant textures would be would be very beneficial.

SUMMARY OF THE INVENTION

Methods for modeling of two-dimensional progressively-variant textures and synthesis of the textures over surfaces are provided. Unlike a homogeneous texture, a progressively variant texture can model local texture variations, including the scale, orientation, color, and shape variations of texture elements.

In a first method of modeling, herein referred to as feature-based warping, the method allows the user to control the shape variations of texture elements, making it possible to capture complex texture variations such as those seen in animal coat patterns. In another method of modeling, herein referred to as feature-based blending, the method can create a smooth transition between two given homogeneous textures, with progressive changes of both shapes and colors of texture elements. Both techniques utilize texton masks to provide smooth transitions in the feature elements of the textures.

For synthesizing textures over surfaces, the biggest challenge is that the synthesized texture elements tend to break apart as they progressively vary. To address this issue, a method is provided based on a texton mask, and more particularly, synthesizes the texton mask along with a target texture on a mesh representation of an object. By leveraging the power of texton masks, the method can maintain the integrity of the synthesized texture elements on the target surface.

BRIEF DESCRIPTION OF THE DRAWINGS

FIG. 2A is an image of a texture.

FIG. 2B is an image of a texton mask for the texture of FIG. 2A.

FIG. 3 is a representation of a transfer function.

FIG. 4 is a representation of an orientation function.

DETAILED DESCRIPTION OF ILLUSTRATIVE EMBODIMENTS

Figure 1:
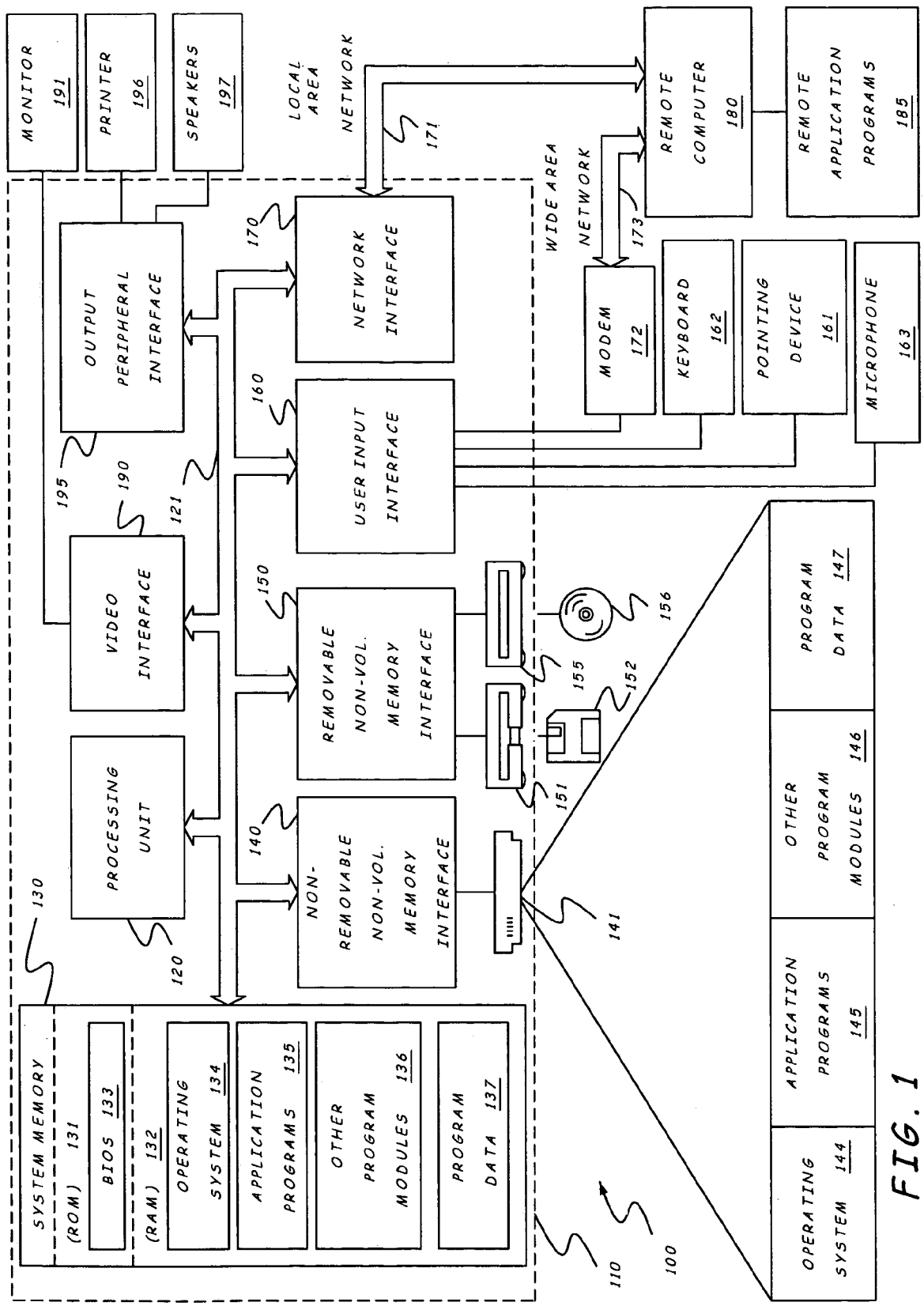
FIG. 1 is a block diagram of an exemplary computing environment for practicing the present invention.

Prior to discussing the present invention in greater detail, an embodiment of an illustrative environment in which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Overview

Aspects of the present invention relate to synthesizing a texture that varies over the surface when it is rendered. As discussed in the background section, many textures in nature include elements that vary in scale, orientation, color and/or shapes such as the spots present on a leopard's fur or stonework of a building. As used herein such textures are called "progressively-variant" textures. Stated another way, a texture is progressively-variant if texture characteristics change smoothly over the texture domain. However, at some level (e.g a small portion such as each point) of the texture domain there should be a neighborhood over which the texture is stationary. One broad aspect relates to generating or modeling a progressively-variant texture that varies in one or more of the above-mentioned characteristics, while in further embodiments, convenient parameters can be varied by a user to adjust these characteristics. Another broad aspect, includes application of a progressively-variant to a simulate the texture on a selected object.

Many of the examples discussed below are directed to simulation of natural occurring textures such as an animal's fur coat. Nevertheless, aspects of the present invention are not intended to be limited to this application and that synthesis and/or application of any progressively-variant texture can benefit from aspects of the present invention including representations of other life forms or non-life forms both realistic and imaginary.

Multi-Channel Texture Representation

Herein a progressively-variant texture is represented by multiple channels, specifically, by a tuple (T, M, F, V) with a texture image T and three user-specified control channels. The texton mask M is a labeling map that marks the prominent texture elements in T. At each pixel p, the texton mask indicates which type of texture elements p belongs to. The orientation field is a vector field defining a unit vector at each pixel of T, whereas the transition function is a function F (e.g. continuous scalar function, although other function could be used) whose characteristic such as a gradient describes the rate and/direction of change in the texture T. FIG. 2A illustrates an exemplary a texture image 200, while texton mask 202 corresponding to the element shapes in the texture image 200 is illustrated in FIG. 2B at 202. FIG. 3 is a pictorial representation of a transition function (F) 300, while FIG. 4 is a pictorial representation of an orientation field (V) 400.

Figure 5:
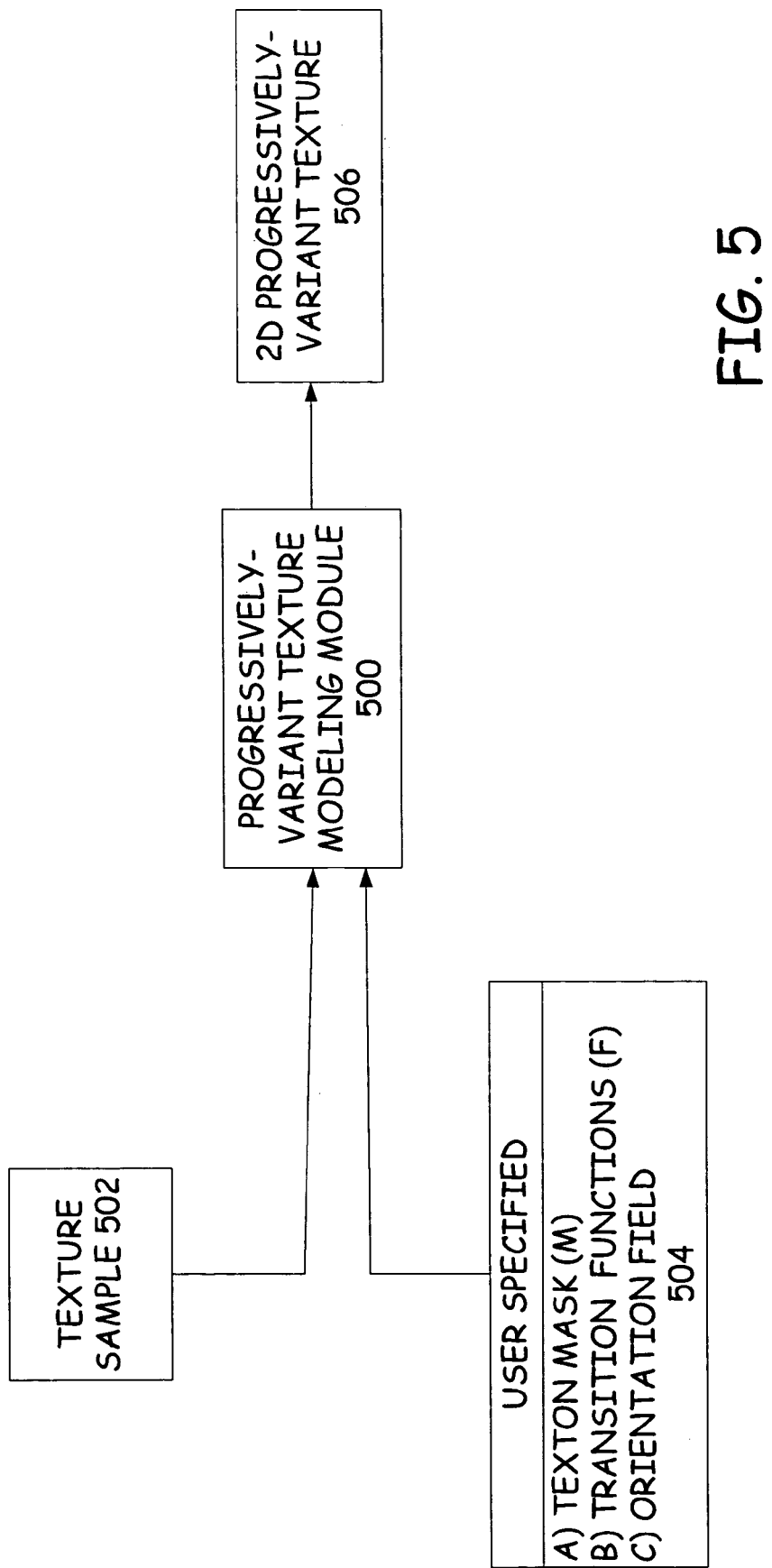
FIG. 5 is a block diagram of a 2D progressively-variant texture modeling system.

FIG. 5 illustrates inputs for generating a a progressively-variant texture in two dimensions ("2D"). A progressively-variant, two dimensional modeling module 500 receives a texture sample 502 commonly a homogeneous sample either created or as an image from a real sample. A user-specified inputs are indicated at 504 and typically include a texton mask M, a transition function F and an orientation field V. The specification of F and V can be similar to the familiar task of specifying vector fields for synthesizing (homogeneous) textures on surfaces such as found in "Texture synthesis on surfaces" by Turk G. published in *Proceedings of SIGGRAPH* 2001 (August), 347–354. Specification of texton mask T can be based on a simple but effective color thresholding method described below.

A progressively-variant 2D texture 506 is created by field distortion and/or feature-based, techniques. In general, the field distortion algorithm or method generates a texture by scaling and rotating the local coordinate frame at each pixel according to the transition function (F) and orientation field (V). Feature-based techniques use the texton mask 202 to guide the synthesis of the target textures by providing a rough sketch of the distribution and shapes of the synthesized texture elements. Specifically, a feature-based warping algorithm or method first warps the texton mask and then uses that to synthesize a new texture. A feature-based blending algorithm or method, if used, takes two homogeneous textures with corresponding texton masks as input and generates a blend texton mask and then a blend texture.

Field Distortion Synthesis

The field distortion algorithm or method implemented by progressively-variant, two dimensional synthesis module 500 synthesizes a progressively-variant texture $T_o$ from a homogeneous sample texture by controlling scale and orientation variations of the texture elements in $T_o$. For texture elements in $T_o$ to change size and orientation smoothly, a continuous transition function $F_o$ and a continuous orientation field $V_o$ of the size of $T_o$ are desired. In one embodiment, a user can specify scale and orientation vectors at a few locations ("keys"), where the modeling module 500 then interpolates these "key" scales and orientations to generate the entire $F_o$ and $V_o$ by using, for instance, radial basis functions. Such a technique is used in generating vector fields on surfaces.

Figure 6:
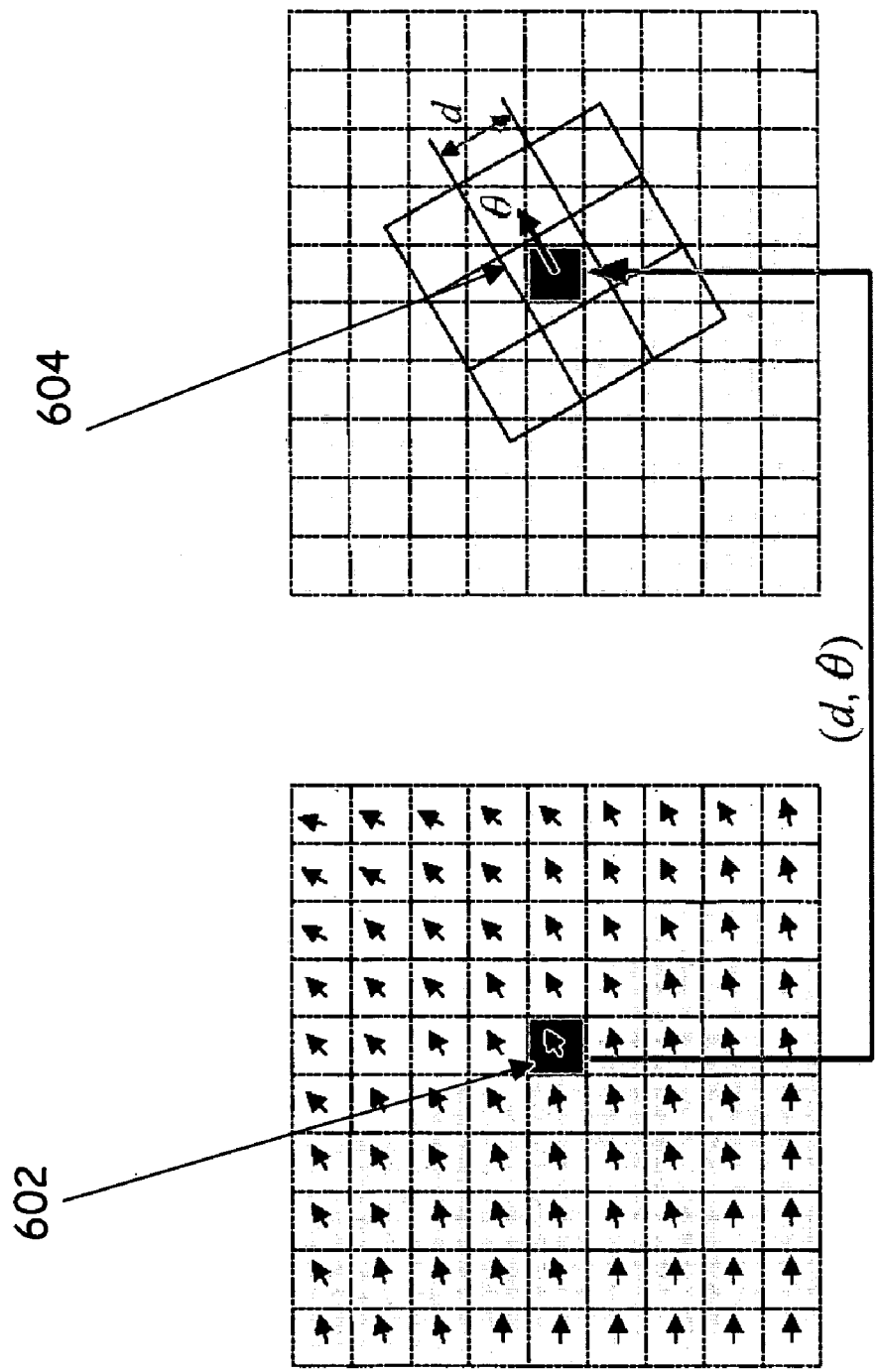
FIG. 6 is pictorial representation of field distortion synthesis.
Figure 7A:
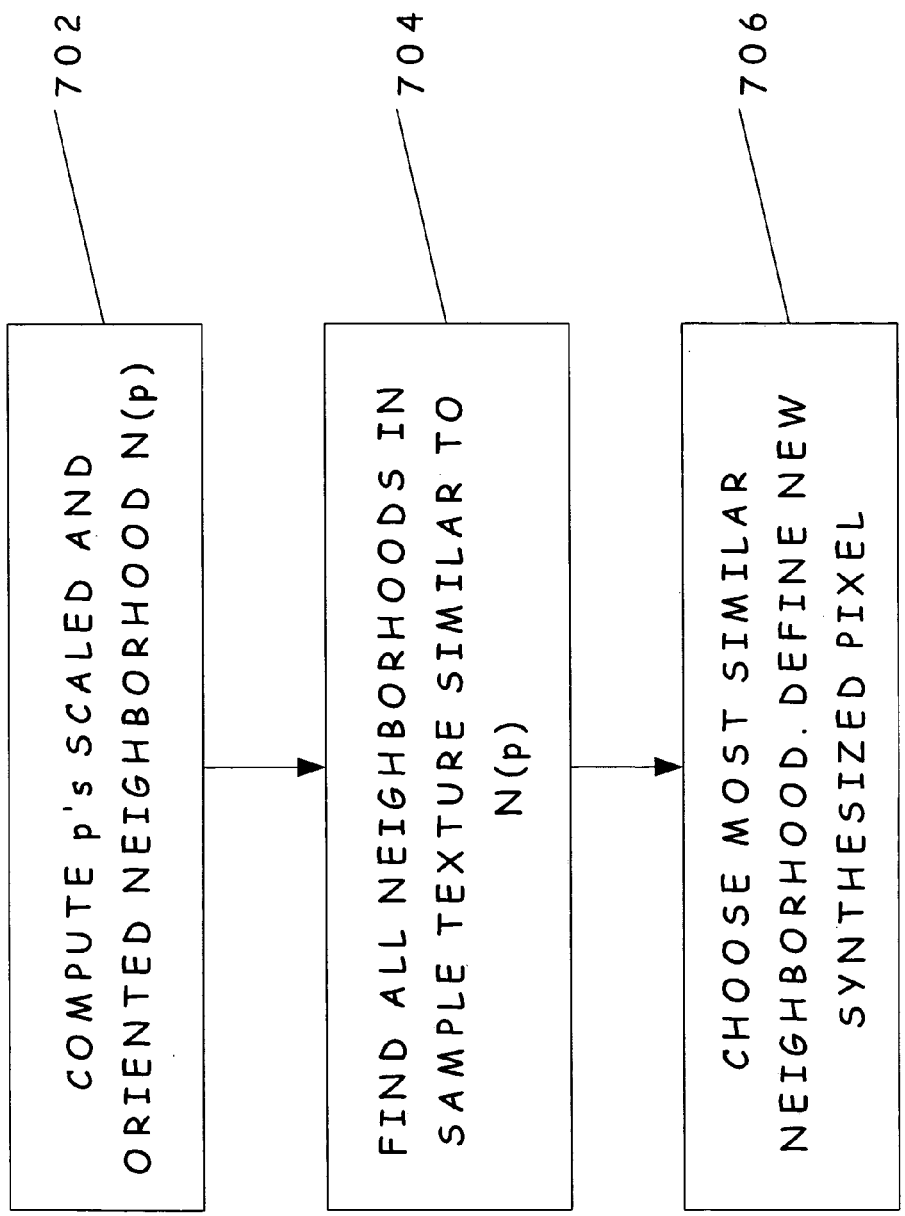
FIG. 7A is a flow chart of a method for field distortion synthesis.

FIG. 6 pictorially illustrates the synthesis process, while FIG. 7A provides a flow chart for the method of synthesis. Essentially the field distortion algorithm incorporates scale and orientation variations controlled by $F_o$ and $V_o$. The algorithm synthesizes $T_o$ pixel-by-pixel. Referring to FIG. 7A, to synthesize a pixel (p) 602, at step 702, the algorithm first scales and orients the target texture $T_o$ to compute the pixel's 602 neighborhood N(p) 604. At step 704, all neighborhoods in sample texture similar to N(p) are found. At step 706, the neighborhood most similar is chosen, taking its center to be the newly synthesized pixel 602. $F_o$ and $V_o$ control the target texture through the construction of the neighborhood N(p) 604. As illustrated in FIG. 6, the pixels in N(p) 604 are not of the same size as the pixels of the target texture $T_o$, instead they are scaled by the scalar $d=F_o(p)$ and oriented according to the vector $V_o(p)$ (herein represented as θ), as illustrated by step 702. The pixels in N(p) 604 are resampled from that of $T_o$ at step 702. In one embodiment, the pixels in N(p) 604 are computed from the four nearest pixels in $T_o$ by bilinear interpolation. This is a simple approximation that works well for a wide range of scales and orientations; however, other techniques can be used. Ideally, the resampling should be weighted by the coverage of N(p)'s pixels in $T_o$. However, computing pixel coverage is a costly operation and typically avoided whenever possible.

The synthesis order has a large effect on the synthesis quality. An order established as in "Texture synthesis on surfaces" by Turk G. published in *Proceedings of SIGGRAPH* 2001 (August), 347–354, which is incorporated herein by reference in its entirety, generates excellent results. Nevertheless, it should be noted also that the self-similarity based texture editing, such as described in "Feature-based image metamorphos is," *Computer Graphics (Proceedings of SIGGRAPH* 92) 26, 2 (July 2002), 35–42 by Brooks, S., and Dodgson, N., can be easily adapted for interactive editing of progressively-variant textures.

Feature-Based Synthesis

To apply feature-based techniques, the user must specify or access a texton mask 202 for a given texture 200. The texton mask 202 identifies prominent features or texture elements of the texture 200. Texton mask construction may be regarded as an image segmentation problem. In the embodiment illustrated, a suitable user interface allows the user to mark prominent texture elements easily. It has been found that a texton mask indicating one or two types of the most prominent texture elements is sufficient for modeling and synthesis of progressively-variant textures.

In one embodiment, the user interface is based on color thresholding. For example, the user can pick one or two pixel colors of the texture 200 and for each color a threshold for color differences is selected. The sample texture is then processed and partitioned accordingly, which when rendered results in an image such as mask 202 having a small number of colors. Similar techniques are well-known. This is a simple and effective technique for textures in which meaningful patterns can be discriminated by colors. It has been found texton masks produced by this technique work well for most textures, mainly for the reason that the feature-based techniques and surface texture synthesis algorithm described below have very low requirements for texton masks and are not sensitive to errors in texton masks. As appreciated by those skilled in the art, more sophisticated segmentation methods can be used to generate better texton masks when necessary.

In addition to color thresholding, support can be provided for morphological operations such as dilation and erosion for refining texton masks.

Feature Based Warping and Blending

A progressively-variant texture can be formed by warping and/or blending. Referring first to warping, a texton mask $M_i$ is used to mark the features or texture elements in the input texture $T_i$ and then editing or modification operations are performed on this mask, producing a new mask $M_o$. The transition function $F_o$ controls the parameters in the editing or modification operations to achieve a smooth progressive variation of patterns in the mask $M_o$. The system can then synthesize a progressively-variant texture To using two texton masks, $M_i$ and $M_o$, and known texture $T_i$.

Figure 7B:
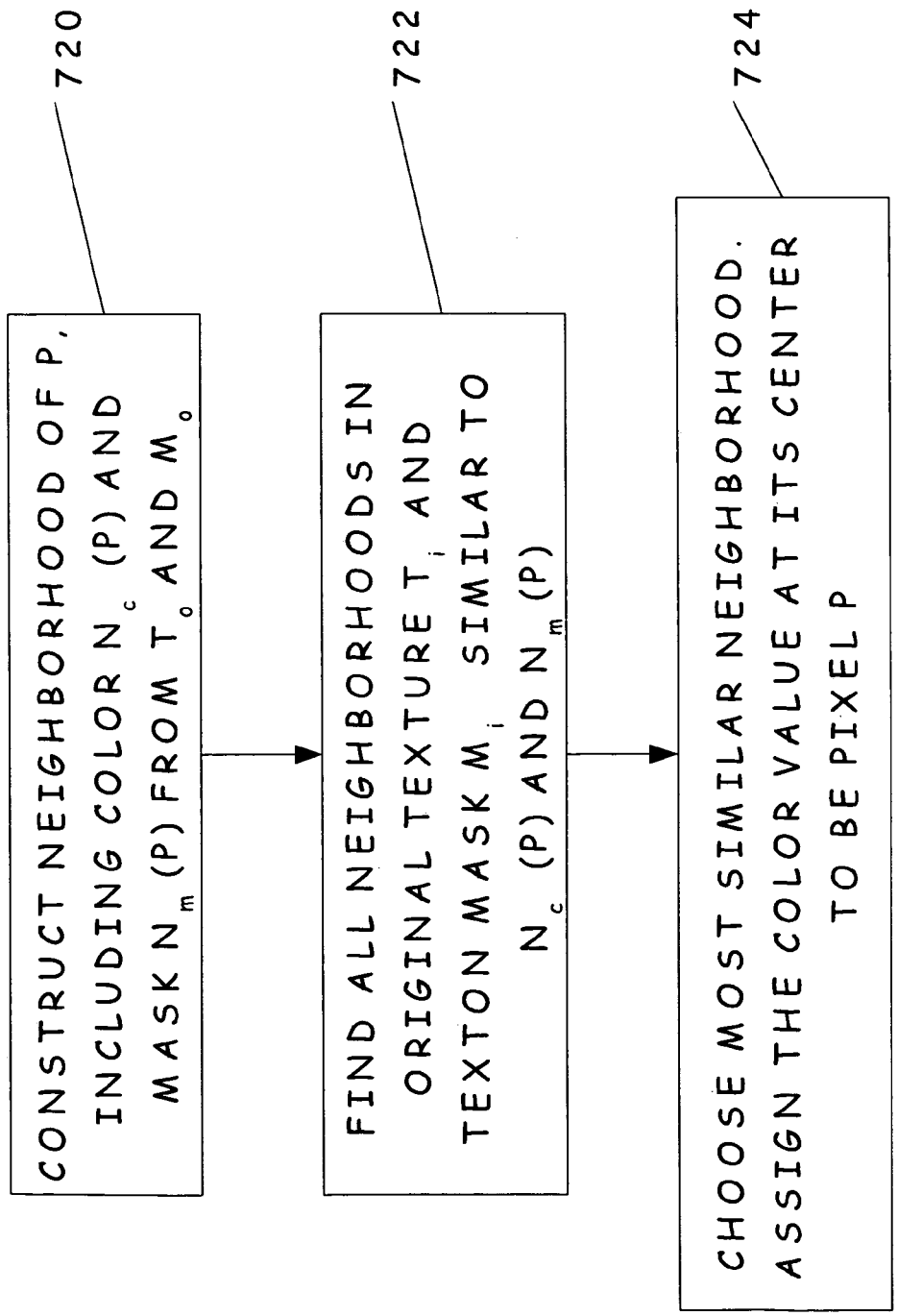
FIG. 7B is a flow chart of a method for texton mask filtering.

The synthesis of the texture $T_o$ can be formulated as an application of image analogies. Specifically, an analogous texture $T_o$ can be found that relates to the new texton mask $M_o$ the same way as original texture $T_i$ relates to its texton mask $M_i$. Referring to FIG. 7B, a method for assigning pixel characteristics for the synthesized texture To includes, at step 720, for each pixel p in $T_o$, neighborhood including color $N_c(p)$ and mask $N_m(p)$ from $T_o$ and $M_o$ is constructed. At step 722, finding all neighborhoods in original texture $T_i$ and texton mask $M_i$ similar to $N_c(p)$ and $N_m(p)$. At step 724, the neighborhood most similar is chosen, assigning the color value at its center to the pixel p.

Using the terminology of image analogies, $T_i$ and $T_o$ are filtered results of the texton masks $M_i$ and $M_o$ respectively. As used herein the step of creating $T_o$ from $M_i$, $M_o$, and $T_i$ is referred to as texton mask filtering.

Texton mask filtering bears some resemblance to the texture-by-numbers technique by Hertzann, A., Jacobs, C. E., Oliver, N., Curless, B., and Salesin, D. H. in "Image analogies." *Proceedings of SIGGRAPH* 2001 (August), 327–340. The latter technique synthesizes a non-homogeneous texture consisting of patches of homogeneous textures from an input non-homogeneous texture that has been segmented into homogeneous patches. The main difference is that texton mask filtering uses fine-grain partitions of the textures (down to the texture element level).

A variety of editing operations can be applied to the original texton mask $M_i$ to generate a desired target mask $M_o$. When the texton masks have few colors, morphological operations such as dilation, erosion, and their combinations can be easily applied. It should also be noted image warping techniques such as mesh warping, field warping, and warping using radial basis functions can be applied. These techniques often require feature points and feature lines to be specified. SUZUKI, S., AND ABE, K. "Topological structural analysis of digital binary images by border following." *Computer Vision, Graphics, and Image Processing* 30, 1, 32–46, 1985, which is incorporated herein by reference, can be used for this purpose. As shown in FIG. 2B, a texton mask often has isolated patterns repeating over the mask. The previously mentioned technique by Suzuki and Abe can be used to extract the boundary contours of these patterns. For image warping, these contours can be used as feature lines and the contour centers as feature points.

Figure 8:
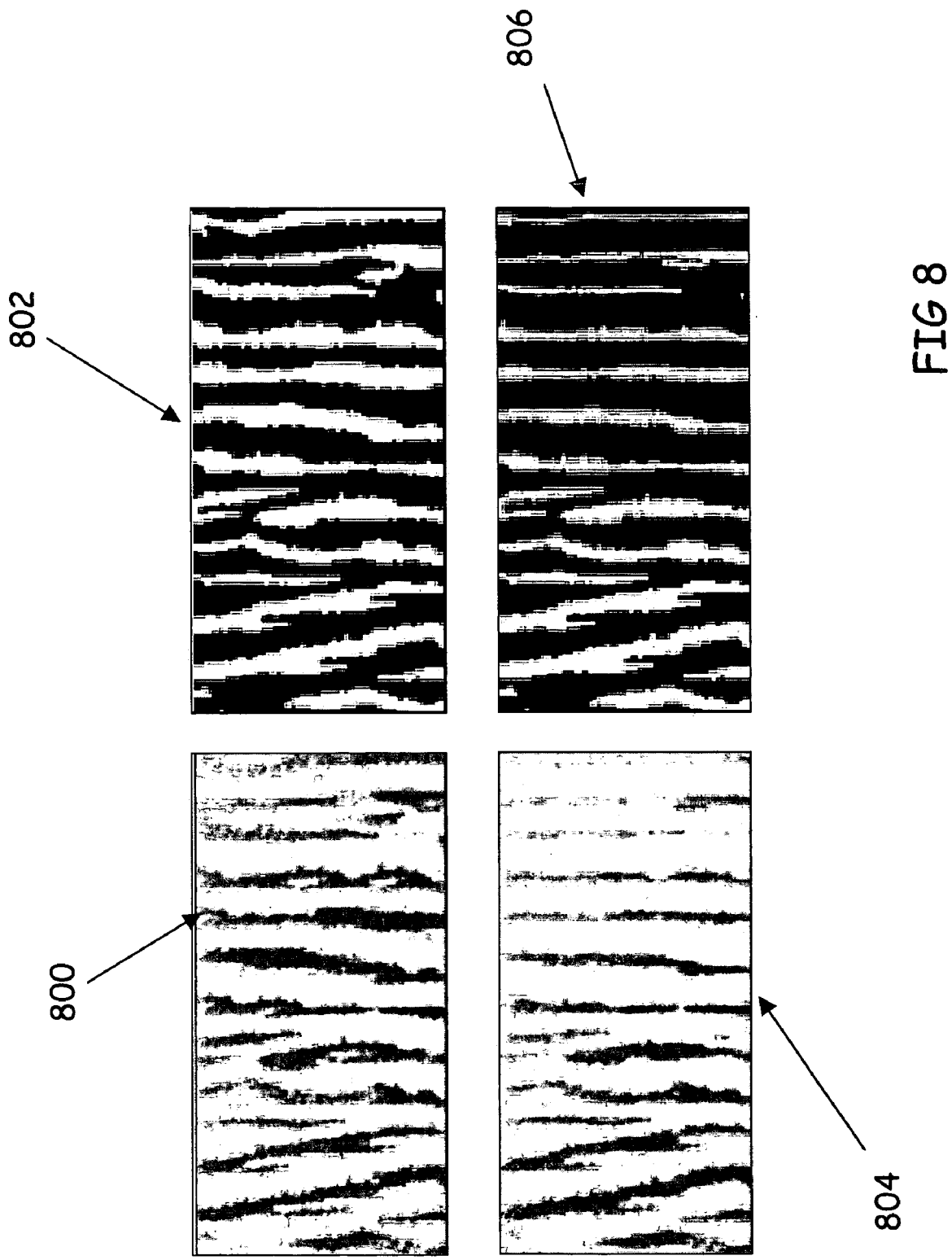
FIG. 8 are images of warped textures and corresponding texton masks.

FIG. 8 shows an example of feature-based warping. Texture 800 and texton mask 802 correspond to a homogenous tiger skin texture, while texture 804 and texton mask 806 are the result after warping where the texton mask 806 is warped by progressively shrinking the stripes horizontally but not vertically.

Figure 9:
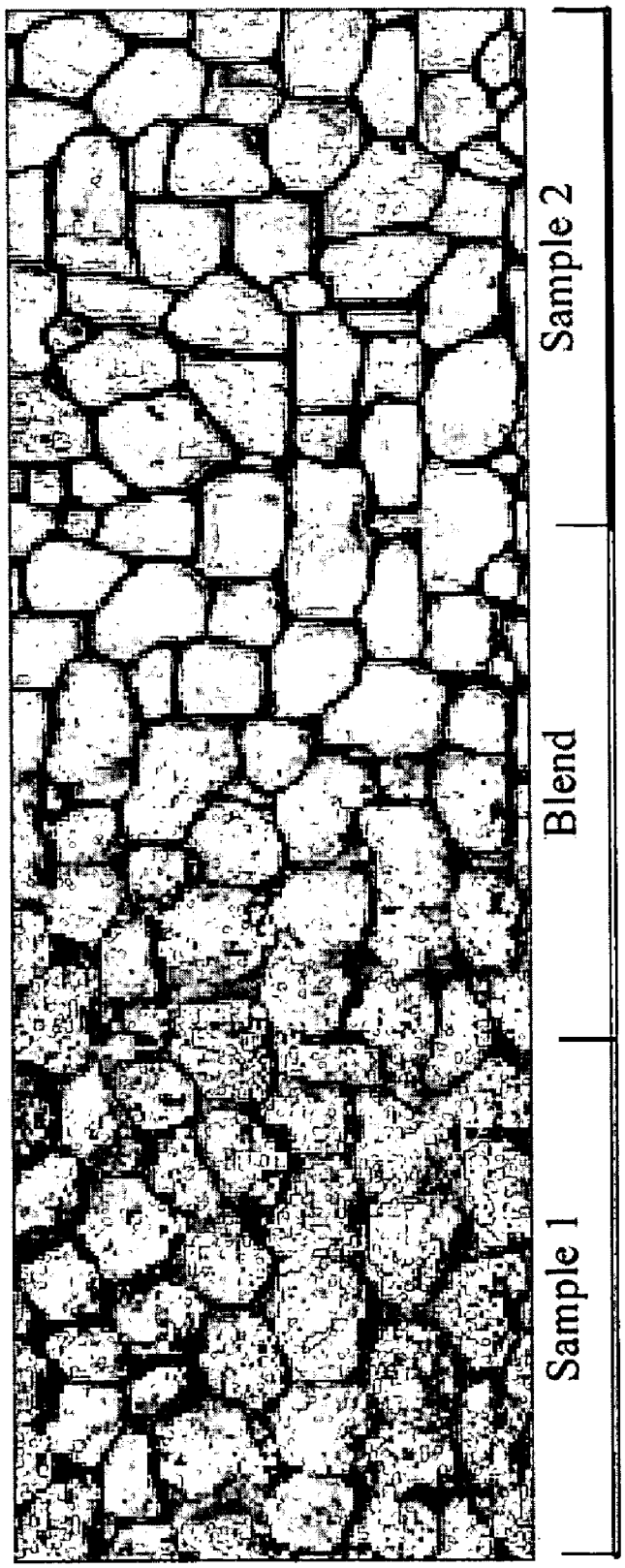
FIG. 9 is an image of a blended texture.

A progressively-variant texture can also be formed by blending two textures. This technique takes two homogeneous textures $T_0$ and $T_1$ as input and generates a progressively-variant texture $T_b$ that provides a smooth transition from $T_0$ to $T_1$ as shown in FIG. 9.

Figure 10:
FIG. 10 are images of texton masks used as a basis to form the blended texture of FIG. 9.

For purposes of simplicity of explanation, assume $T_0$, $T_1$, and $T_b$ are all of the same size and are defined on the unit square $[0,1] \times [0,1]$. Also a simple linear transition function $F_b(x, y) = x$ defined on $[0,1] \times [0,1]$ is used. In addition, referring to FIG. 10, binary texton masks $M_0$ 1000 and $M_1$ 1002 for $T_0$ and $T_1$, respectively, are used.

Figure 11:
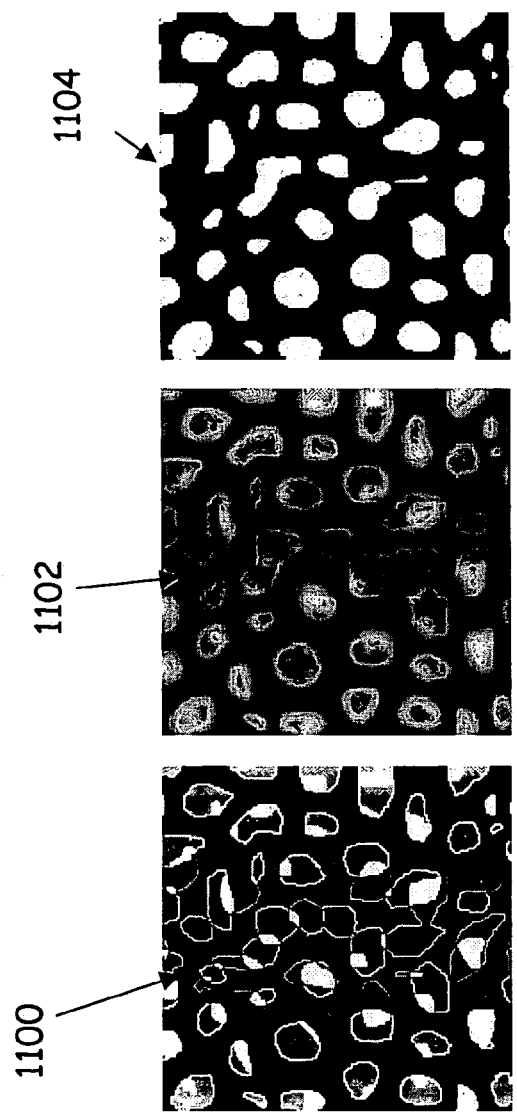
FIG. 11 are images illustrating creation of a blended mask.

Blending begins with the construction of $M_b$. This can be done in a few different ways. A simple technique is the following. Ideally, it is desired that $M_b(x, y)$ to be like $M_0$ when $x \approx 0$ and like $M_1$ when $x \approx 1$. To achieve this goal, 2D binary functions $M_0$ and $M_1$ are interpolated in 3D and a diagonal 2D slice is taken, obtaining $M(x, y) = xM_1(x, y) + (1-x)M_0(x, y)$. $M(x, y)$ behaves like $M_0$ when $x \approx 0$ and like $M_1$ when $x \approx 1$. A smoothing operation such as a Gaussian blur $M(x, y)$ is used to smooth out the discontinuity inherited from $M_1$ and $M_2$. Finally, the values of $M(x, y)$ are converted using a user-selected threshold to realize the binary mask $M_b$. FIG. 11 illustrates the construction of texton mask $M_b$ used in the middle portion of FIG. 9. Image 1100 illustrates $M(x,y)$ Image 1102 illustrates a Gaussian-blurred $M(x,y)$ and image 1104 illustrates texton mask $M_b$.

Having constructed the texton mask $M_b$, the blend texture $T_b$ can be constructed. In particular, $T_b$ can be obtained by color blending two modified textures $T'_0$ and $T'_1$ according to the transition function $F_b$, where modified texture $T'_0$ can be synthesized from two texton masks, $M_0$ and $M_b$, and texture $T_0$ by using texton mask filtering described above, and where modified texture $T'_1$ can be synthesized from $M_1$ and $M_b$, and texture $T_1$ in the same way. Because $T'_0$ and $T'_1$ share the same texton mask $M_b$, features in $T'_0$ and $T'_1$ are aligned and thus the color blending of $T'_0$ and $T'_1$ will not cause "ghosting".

Surface Texture Synthesis

A 2D progressively-variant texture sample ($T_o$, $M_o$, $F_o$, $V_o$) is used for synthesis on a selected object. In general, the user specifies a transition function $F_s$ and orientation field $V_s$ on a target mesh of the selected object. On the mesh, the synthesis algorithm controls the scale and orientation variation of texture elements by matching $F_s$ and $V_s$ with their 2D counterparts. The application algorithm synthesizes a texton mask $M_s$ in conjunction with the target texture $T_s$ and uses $M_s$ to prevent the breaking of texture elements.

Thus, given a surface mesh of an object and a progressively-variant 2D texture $T_o$ with transition function $F_o$, orientation field $V_o$, and texton mask Mo, a progressively-variant texture $T_s$ can be synthesized on the mesh. As in the case of homogeneous texture synthesis, the user needs to specify an orientation field $V_s$ on the mesh by providing the orientations at some key locations. For progressively-variant textures, the user may also need to specify a transition function $F_s$ on the mesh in a similar fashion. From the user-specified values, the system can interpolate the entire $V_s$ and $F_s$ using Gaussian radial basis functions, where the radius is the distance over the mesh.

The synthesis algorithm or method is based on texton masks. In a progressively variant texture synthesized without texton masks, texture elements tend to break apart as discussed in the background section. The breaking of texture elements is caused by the fact that the standard L2-norm is a poor perceptual measure for neighborhood similarity, which is at the heart of all texture synthesis algorithms following a nonparametric sampling approach. Ideally, a good perceptual measure should account for the fact that the human visual system is most sensitive to edges, corners, and other high-level features in images. The simple L2-norm cannot account for this fact and the associated synthesis process often smoothes out the edges in the output texture, leading to breaking and re-mixing of texture elements.

To prevent the breaking of texture elements, the synthesis algorithm or method synthesizes a texton mask $M_s$ in conjunction with the texture $T_s$. This algorithm is based on two ideas. First, texton masks are resistant to damage caused by deficiencies in the L2-norm. Specifically, non-parametric sampling can only generate pixel values that already exist in the input texture and thus cannot smooth out edges when the input texture has few colors, which is the case for texton masks.

The second concept in synthesis is to leverage the damage resisting property of texton masks. By synthesizing a texton mask on the target surface, the mask can be used to guide the texture synthesis process by encouraging it to pick, for each mesh vertex v, the color of a pixel p in the 2D texture sample such that v and p have the same texton mask value.

As indicated above, the synthesis method synthesizes the texton mask $M_s$ along with the target texture $T_s$ on the mesh. In short, for each mesh vertex, after its neighborhood is flattened and resampled, a texton mask value for vertex v in the 2D texton mask $M_o$ is determined or searched. Then, both the resampled color and texton mask values are used to jointly search for the color value at vertex v.

A single-resolution and single-pass version of the synthesis method is as follows. A pass is made through the vertices of the mesh and a color and a texton mask value is picked for every vertex. The orientation field $V_s$ is used to determine the processing order of mesh vertices. This technique can noticeably improve the synthesis quality.

At each vertex v, the color is obtained through the following steps. First, color and mask neighborhoods $N_c(v)$ and $N_m(v)$, respectively, are constructed in the tangent plane of the surface at v (i.e., for each neighborhood the vertices are considered flattened). Within the tangent plane, $N_c(v)$ and $N_m(v)$ have the same orientation, which is determined by the surface orientation field value $V_s(v)$. The neighborhood $N_c(v)$ contains color values resampled from that of the vertices near v. Likewise, the neighborhood $N_m(v)$ holds texton mask values resampled from that of the vertices near v.

In the next step, all candidate pixels for vertex v in the 2D texture $T_o$ are collected and put in the candidate pool $C(v,\epsilon)$. To qualify for $C(v,\epsilon)$, a candidate pixel p must satisfy the condition $$|F_o(p)-F_s(v)|<\epsilon, \qquad (1)$$

where $\epsilon$ is a prescribed tolerance for mismatch in transition function values. For all the examples discussed herein, $\epsilon=0.1$ for transition function values normalized to lie in the interval [0,1].

Two searches are then performed, one for texton mask value $M_s(v)$ and the other for vertex color $T_s(v)$. For $M_s(v)$, a pixel p is ascertained in $C(v,\epsilon)$ such that the distance between the neighborhoods $N_m(v)$ and $N_m(p)$ is the smallest, where $N_m(p)$ is a neighborhood of p in the 2D texton mask $M_o$.

Searching for $T_s(v)$ is slightly more complex. A pixel p in the candidate pool $C(v,\epsilon)$ is desired such that the following sum of two distances $$\text{dist}(N_c(v),N_c(p))+\text{dist}(N_m(v),N_m(p))$$

is the smallest, where $N_c(p)$ is a neighborhood of p in the 2D texture $T_o$. The neighborhoods $N_c(p)$ and $N_m(p)$ have the same orientation, which is determined by the 2D orientation field value $V_o(p)$. The pseudo-code of the method is as follows.

```
For each vertex v on surface
    construct neighborhoods N_c(v) and N_m(v)
    build candidate pool C(v,ε)
    smallest_match = INFTY
    For each pixel p = (a,b) in C(v,ε)
        construct neighborhoods N_m(p)
        New_match = dist(N_m(v),N_m(p))
        If (new_match < smallest_match)
            smallest_match = new_match
            Mask_value = M_o(p)
    M_s(v) = mask_value
    Smallest_match = INFTY
    For each pixel p=(a,b) in C(v,ε)
        construct neighborhoods N_c(p) and
            N_m(p)
        new_match=dist(N_c(v),N_c(p))+
            dist(N_m(v),N_m(p))
        If (new_match < smallest_match)
            Smallest_match=new_ match
            color = T_o(p)
    T_s(v) = color
```

In a further embodiment, a two-pass multi-resolution synthesis improves the synthesis quality. In addition, a refinement pass with a small neighborhood size can be performed. This refinement pass is very fast and noticeably improves synthesis results.

Neighborhood Construction

In one embodiment, a larger (i.e., having more pixels) neighborhoods $N_m(v)$ and $N_m(p)$ is used when searching for the texton mask value at v. Whereas, when searching for the color value at v, a smaller neighborhood size for both the color neighborhoods $N_c(v)$ and $N_c(p)$ and the texton mask neighborhoods $N_m(v)$ and $N_m(p)$ can be used. The rationale behind this choice is that texton masks determine the layout of texture elements whereas the synthesis of pixel colors is simply a step to fill in the details.

Another technical issue is the local adaptation of the size of the neighborhood $N_c(p)$. One would expect that as texture elements change sizes, the neighborhood used to capture them should also change. This is indeed the case and $N_c(p)$ should really be $N_c(p,s)$ where $s=F_o(p)$ is the scale at p. Let $N_c(p,s_{min})$ be the smallest neighborhood and $N_c(p, s_{max})$ be the largest. The size of $N_c(p,s)$ can be determined by linearly interpolating between that of $Nc(p, s_{min})$ and $N_c(p, s_{max})$ and rounding the result up to the nearest integer. The same local adaptation technique applies to neighborhoods $N_m(p)$, $N_c(v)$ and $N_m(v)$.

Matching Transition Functions

The synthesis algorithm requires matching the transition function values when searching for the color and texton mask value of a vertex v. This is met by confining the search to the candidate pool $C(v,\epsilon)$. This approach is very different from most existing algorithms for synthesizing stationary textures on surfaces, as these algorithms simply search all pixels of the 2D sample texture $T_o$. An advantage of searching all pixels is that hierarchical data techniques such as kd-trees and tree-structured vector quantization (TSVQ) can be precomputed and used to accelerate the search. Unfortunately, the pixel p found by the search may not satisfy the condition in Equation (1), which is needed for progressively-variant textures.

In the synthesis method, the matching of transition function values is guaranteed since a qualified candidate p in $C(v,\epsilon)$ is required to satisfy the condition in Equation (1). With $C(v,\epsilon)$ so constructed, kd-trees or TSVQ can not be used to accelerate the search because $C(v,\epsilon)$ changes from vertex to vertex, making pre-computation of kd-trees and TSVQ impossible. To address this problem, $C(v,\epsilon)$ is searched using a k-coherence technique proposed by Tong et al. in "Synthesis of bidirectional texture functions on arbitrary surfaces.", *ACM Transactions on Graphics* 21, 3 (July 2002), 665–672. (*Proceedings of ACM SIGGRAPH* 2002), incorporated herein by reference. According to the standard k-coherence criteria, $C(v,\epsilon)$ should be populated with pixels that are appropriately "forward-shifted" with respect to pixels already used for synthesis. In addition to each "forward-shifted" pixel, its (k−1) nearest neighbors by the neighborhood distance should also be included in $C(v,\epsilon)$. The algorithm builds $C(v,\epsilon)$ using the k-coherence technique with an additional check for the condition in Equation (1) for each candidate pixel p. The k-coherence technique can be accelerated by pre-computing the k nearest neighbors for each pixel of the 2D sample texture. For instance, k can be set to 20.

An alternative approach to handling the transition functions is to put the transition function values in the alpha channel and compute the L2-norm of RGBA-vectors during texture synthesis. For progressively-variant textures, this technique has the drawback that the pixel found by the search procedure may not satisfy the condition in Equation (1).

It should be noted for synthesis of stationary textures on a mesh, it is standard to have an orientation field on the mesh. The difference with a progressively-variant texture is that it needs an orientation field on the input 2D texture as well.

Although the present invention has been described with reference to particular embodiments, workers skilled in the art will recognize that changes may be made in form and detail without departing from the spirit and scope of the invention.

What is claimed is:

1. A computer implemented method for rendering a synthesized image, comprising:
   accessing a first texton mask and a second texton mask, each texton mask being indicative of feature elements in respective first and second sample textures;
   creating a third texton mask being based on a combination of the first texton mask and the second texton mask; and
   creating a synthesized texture image guided by the first texton mask, the second texton mask, the first sample texture and the second sample texture, wherein creating the synthesized texture comprises:
   creating a first modified texture guided by the first texton mask, the third texton mask and the first sample texture;
   creating a second modified texture guided by the second texton mask, the third texton mask and the second sample texture;
   combining the first modified texture and the second modified texture.

2. The method of claim 1 wherein creating the third texton mask comprises interpolating between the first texton mask and the second texton mask.

3. The method of claim 2 wherein interpolating between the first texton mask and the second texton mask comprises interpolating two dimensional functions of the first texton mask and the second texton mask in three dimensions and obtaining a two dimensional portion.

4. The method of claim 2 wherein creating the third texton mask comprises smoothing the third texton mask after interpolating.

5. The method of claim 4 wherein smoothing comprises using a Gaussian function.

6. The method of claim 4 wherein creating the third texton mask comprises setting values of the third texton mask as a function of a threshold.

7. The method of claim 1 wherein combining the first modified texture and the second modified texture includes using a selected transition function.

8. The method of claim 1 wherein creating the first modified texture includes identifying a portion of the first modified texture to synthesize and identifying a corresponding portion of the third texton mask for the portion to be synthesized, and wherein creating the second modified texture includes identifying a portion of the second modified texture to synthesize and identifying a corresponding portion of the third texton mask for the portion to be synthesized.

9. The method of claim 8 wherein creating the first modified texture includes identifying a portion of the first texton mask similar to the portion of the third texton mask and identifying a corresponding portion of the first sample texture corresponding to the portion of the first texton mask, and wherein creating the second modified texture includes identifying a portion of the second texton mask similar to the portion of the third texton mask and identifying a corresponding portion of the second sample texture corresponding to the portion of the second texton mask.

10. The method of claim 9 wherein creating the first modified texture includes assigning pixel characteristics of the portion of the first modified texture according to the portion of the first sample texture, and wherein creating the second modified texture includes assigning pixel characteristics of the portion of the second modified texture according to the portion of the second sample texture.

11. A computer implemented method for rendering a synthesized texture on an image of a three-dimensional object, comprising:
   accessing a two-dimensional progressively-variant sample texture, a texton mask for the sample texture and a representation of the three-dimensional object comprising a mesh of a plurality of vertices; and
   creating a synthesized texture on the object guided by the two-dimensional progressively-variant sample texture, the texton mask for the sample texture and the mesh of a plurality of vertices, wherein creating the synthesized texture comprises synthesizing a texton mask on the mesh along with a target texture by determining a texton mask value and determining a color value at each vertex, and wherein determining the color value includes determining a candidate pool of pixels to select from, and wherein determining the texton mask value includes forming a first neighborhood of mask values of vertices about each vertex and a second neighborhood of mask values about each pixel in the candidate pool of pixels, and selecting the mask value for the candidate pixel having the smallest distance between the first neighborhood of mask values of the vertex and the second neighborhood of mask values about each pixel in the candidate pool of pixels.

12. The method of claim 11 wherein determining the color value includes forming a first neighborhood of color values of vertices about each vertex and a second neighborhood of color values about each pixel in the candidate pool of pixels.

13. The method of claim 12 wherein determining the color value at each vertex includes selecting the color value for the candidate pixel having the smallest of the sum of the distance between the first neighborhood of mask values of the vertex and the second neighborhood of mask values about each pixel in the candidate pool of pixels and the distance between the first neighborhood of color values of the vertex and the second neighborhood of color values about each pixel in the candidate pool of pixels.

14. The method of claim 13 wherein a number of pixels forming the neighborhoods of mask values is greater than a number of pixels forming neighborhoods of color values.

* * * * *